US00RE36981E

United States Patent [19]

Birtchet

[11] E Patent Number: Re. 36,981

[45] Reissued Date of Patent: Dec. 5, 2000

[54] ELECTRICALLY HEATED PAVING SCREED

[75] Inventor: Ralph D. Birtchet, Centralia, Wash.

[73] Assignee: Universal Screed Inc., Centralia, Wash.

[21] Appl. No.: 08/797,778

[22] Filed: Feb. 7, 1997

Related U.S. Patent Documents

Reissue of:

[64] Patent No.: 5,417,516
Issued: May 23, 1995
Appl. No.: 08/094,906
Filed: Jul. 20, 1993

[51] Int. Cl.[7] ..... E01C 23/14

[52] U.S. Cl. ..... 404/71; 404/95; 404/118; 219/528

[58] Field of Search ..... 404/71, 77, 79, 404/91, 92, 93, 94, 95, 96, 101–103, 90, 84.1, 114, 118, 119; 219/243, 528, 549

[56] References Cited

U.S. PATENT DOCUMENTS

| | | | |
|---|---|---|---|
| 3,557,672 | 1/1971 | Shurtz et al. . | |
| 3,625,121 | 12/1971 | Blumer et al. . | |
| 3,986,783 | 10/1976 | Rowley et al. | 404/77 |
| 4,175,885 | 11/1979 | Jeppson | 404/77 |
| 4,319,856 | 3/1982 | Jeppson . | |
| 4,407,605 | 10/1983 | Wirtgen . | |
| 4,429,216 | 1/1984 | Brigham . | |
| 4,507,015 | 3/1985 | Furukawa et al. . | |
| 4,656,339 | 4/1987 | Grise . | |
| 4,661,689 | 4/1987 | Harrison . | |
| 4,714,374 | 12/1987 | Mihara . | |
| 4,717,812 | 1/1988 | Makita . | |
| 4,725,717 | 2/1988 | Harrison . | |
| 4,765,772 | 8/1988 | Benedetti et al. . | |
| 4,942,078 | 7/1990 | Newman et al. . | |
| 5,004,895 | 4/1991 | Nishino et al. . | |
| 5,096,331 | 3/1992 | Raymond . | |
| 5,229,583 | 7/1993 | Van Egmund et al. | 219/549 |
| 5,259,693 | 11/1993 | Raymond | 404/118 X |
| 5,395,179 | 3/1995 | Kutani | 404/77 X |

FOREIGN PATENT DOCUMENTS

| | | | |
|---|---|---|---|
| 4-161604 | 6/1992 | Japan | 404/79 |

*Primary Examiner*—James A. Lisehora
*Attorney, Agent, or Firm*—Christensen O'Connor Johnson and Kindness PLLC

[57] ABSTRACT

A heated screed assembly (10) for use with a paving machine (12) includes a screed (16). An elastomeric, electrically-powered heating element (36) is carried on the upper surface (28) of the screed. A retaining member (48) is disposed to overly the heating element, whereby the heating element is retained in contact with the upper surface of the screed during operation of the paving machine. Electric power is supplied to the elastomeric heating element by a generator (44).

16 Claims, 3 Drawing Sheets

ELECTRICALLY HEATED PAVING SCREED

Matter enclosed in heavy brackets [ ] appears in the original patent but forms no part of this reissue specification; matter printed in italics indicates the additions made by reissue.

TECHNICAL FIELD OF THE INVENTION

The present invention relates to asphalt paving equipment, and more particularly to floating screeds used in compacting paving material.

BACKGROUND OF THE INVENTION

The laying of asphalt paving material on road surfaces entails spreading an aggregate-filled tar-based paving material on a prepared road bed. The paving material is spread while hot and is then compacted so that upon cooling a hard pavement surface is formed. Conventional paving machines utilize a heavy metal plate termed a "screed," usually constructed of steel or iron, to compact the paving material. The screed is typically mounted on pivot arms at the rear end of the paving machine, and "floats" up and down in the vertical direction as it is pulled over the paving material. The weight of the screed, as well as other structures carried on the screed, acts to compress and tamp the paving material into a compact layer.

To facilitate compaction of the paving material, the screed must be heated, typically to a temperature of about 180° to 300° F., to assist the paving material in flowing under the screed and to reduce adhesion of the paving material to the screed. If the screed is not adequately heated, the tar in contact with the bottom of the screed begins to harden, resulting in buildup of paving material and excessive drag.

Most conventional screeds are heated through the use of fossil fuel powered burners that heat the upper surface of the screed by the direct application of flame or hot exhaust gases. For example, many conventional screed heaters are powered with propane gas or fuel oil. The use of fossil fuel burners to heat screeds has several drawbacks. Combustion of fossil fuels generates large amounts of smoke, particularly when fuel oils are burned.[.] This smoke represents a source of environmental pollution, and may also pose a potential health hazard to paving workers. Additionally, because the burners heat some portions of the screed, where the flame or exhaust gas actually contacts the screed surface, more than other portions of the screed, warping of the screed may result. The contour of the screed determines the evenness of the paving material that is being compacted by the screed. Screeds are often flexed under extreme tensile loads during use to achieve desired crowning or other surface contour of the paving material. When a screed has been warped by the uneven application of heat, the contour produced by the screed may be other than that which is desired.

Most conventional floating screeds are also subjected to vibration during use to help in compaction of the paving material. For example, eccentric cams are mounted in contact with the screed and are rotated to induce vibration. Any heating systems for screeds must be able to withstand this high frequency vibration without breakage or failure.

One alternate heating system that represents an improvement in the environmental drawbacks of fossil fuel powered screed heaters is disclosed in U.S. Pat. No. 5,096,331 to Raymond. That patent discloses a "liquid circuit heat transfer system" for heating screeds, and entails forcing hydraulic oils through a narrow orifice. Friction created by flow of the oil through the orifice results in an increase in temperature of the oil, which is routed through a tubing system to heat the screed. While offering some advantages over fossil fuel powered heating systems, such liquid circuit heating systems suffer from other drawbacks. Because of the vibration to which the screed is subjected, there is a potential for breakage of tubes or fittings through which the heated oil is routed, which could result in leakage of the heating fluid. Additionally, the time required to initially bring the screed to the temperature upon start of operation may be unduly long due to the limited heat capacity of the heating fluid.

Also, conventional liquid [current] *circuit* heating systems utilize hydraulic fluid as the heating fluid. The heating fluid circuit is typically connected to the paving machine's primary hydraulic circuit. This connection results in the inability to utilize the primary hydraulic circuit to power other hydraulic devices included on the paving machine while the heating system is being operated. For example, the vibratory units on paving screeds are typically powered by the hydraulic pump on the paving machine. When a liquid circuit heat transfer as conventionally configured is utilized, it is not possible to simultaneously operate both the heat system and the vibratory units.

SUMMARY OF THE INVENTION

The present invention provides a heated screed assembly including a screed, an elastomeric, electrically powered heating element disposed in contact with the screed, and an electric power supply. In a further aspect of the present invention, the heated screed assembly includes a screed defining an upper surface, an electrically powered resistive heating element carried on the upper surface of the screed, and a retaining member disposed to overlie the heating element, whereby the heating element is retained in contact with the upper surface of the screed during operation of the paving machine.

A method for heating a screed for use with a paving machine is also provided, and involves supplying electric power to an elastomeric heating element disposed in contact with the screed.

The present invention provides several advantages over conventional heating systems. Because electric power is utilized to power the heating element, the environmental disadvantages associated with burning of fossil fuels are avoided. Because the heating element is positioned to cover a large portion of the surface area of the screed, heat is applied uniformly and evenly across the length and width of the screed. Warping that may be associated with hot spots caused by use of conventional fossil fuel powered burners is thus avoided.

At the same time, because the preferred electric heating element utilized is an elastomeric member, the heating element is able to withstand the vibration to which screeds are subjected during operation, without breakage of the resistance circuit or failure of the heating element.

The use of electricity to power the heating element enables the screed to be brought up to operation temperature extremely rapidly. The majority of the heat generated by the heating element is conducted into the screed, rather than being lost to the atmosphere. Thus, the time period required for bringing the screed up to temperature is substantially less than that required when fossil fuel burners are utilized. Because the heating element itself is brought to temperature rapidly, the time delay associated with heating the oil in a conventional liquid circuit heat transfer systems is also lessened.

The electric powered heating system of the present invention is not fluidly connected to the primary hydraulic circuit of the paving machine, as is required for liquid circuit heat transfer systems. Thus, the present invention enables the ability to operate hydraulically powered accessories on a paving machine, such as the vibratory units, and the heating system at the same time. This facilitates compliance with federal regulations, which require the operation of vibratory units at all times during paving to ensure that fine aggregates are brought to the surface in the paving material during compaction.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
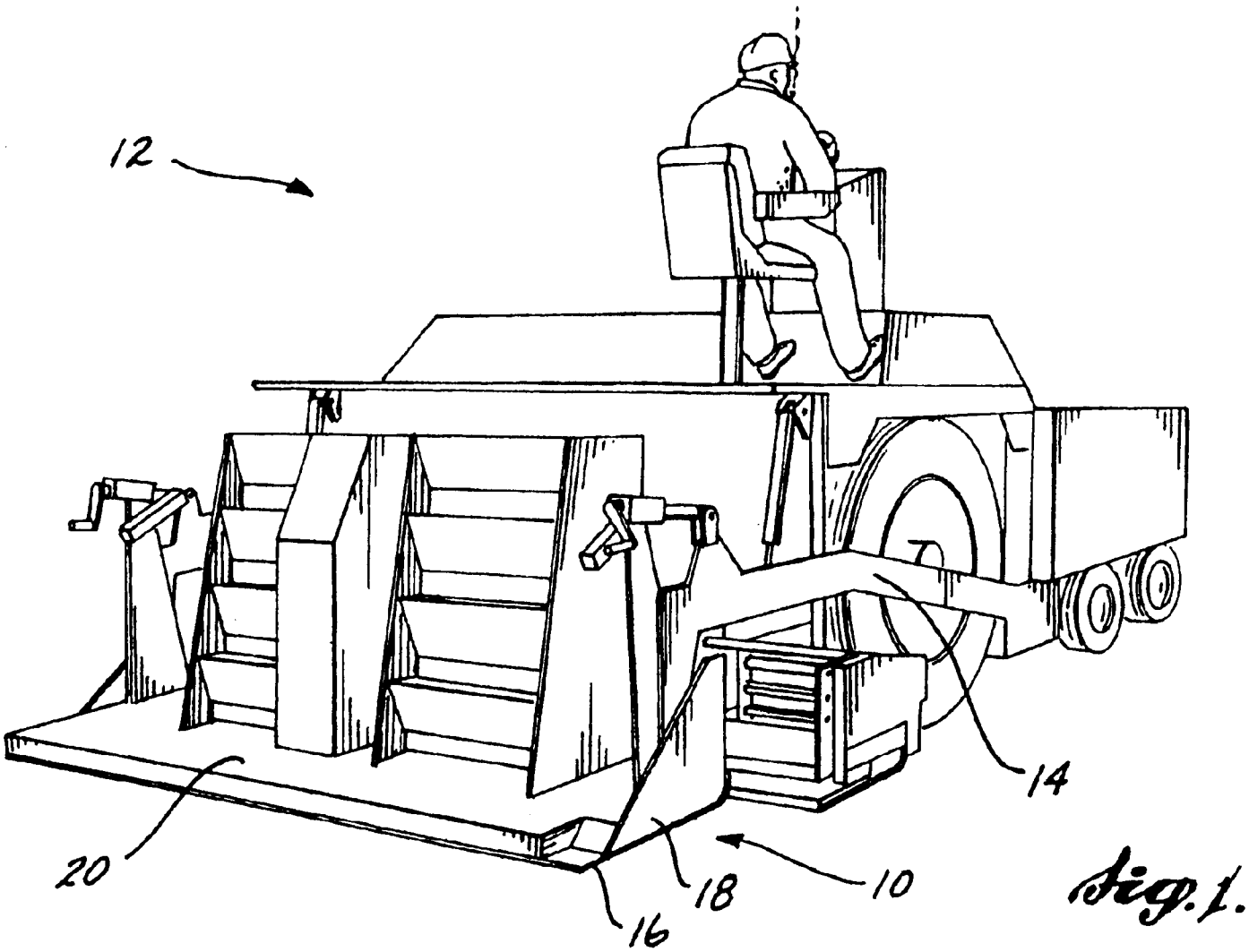
FIG. 1 provides a pictorial view of a heated screed constructed in accordance with the present invention mounted on the back of a paving machine.

A heated screed assembly 10 constructed in accordance with the present invention is shown mounted on the back of a paving machine 12 in FIG. 1. The heated screed assembly 10 is pivotally mounted to "float" behind the paving machine in the conventional manner on arms 14. The heated screed assembly 10 includes a screed 16 that is connected to, and supported by, a mold board (not shown in FIG. 1). Side buttress plates 18 reinforce the screed mounting. A deck plate 20 overlies, and is spaced above, the screed 16.

Figure 2:
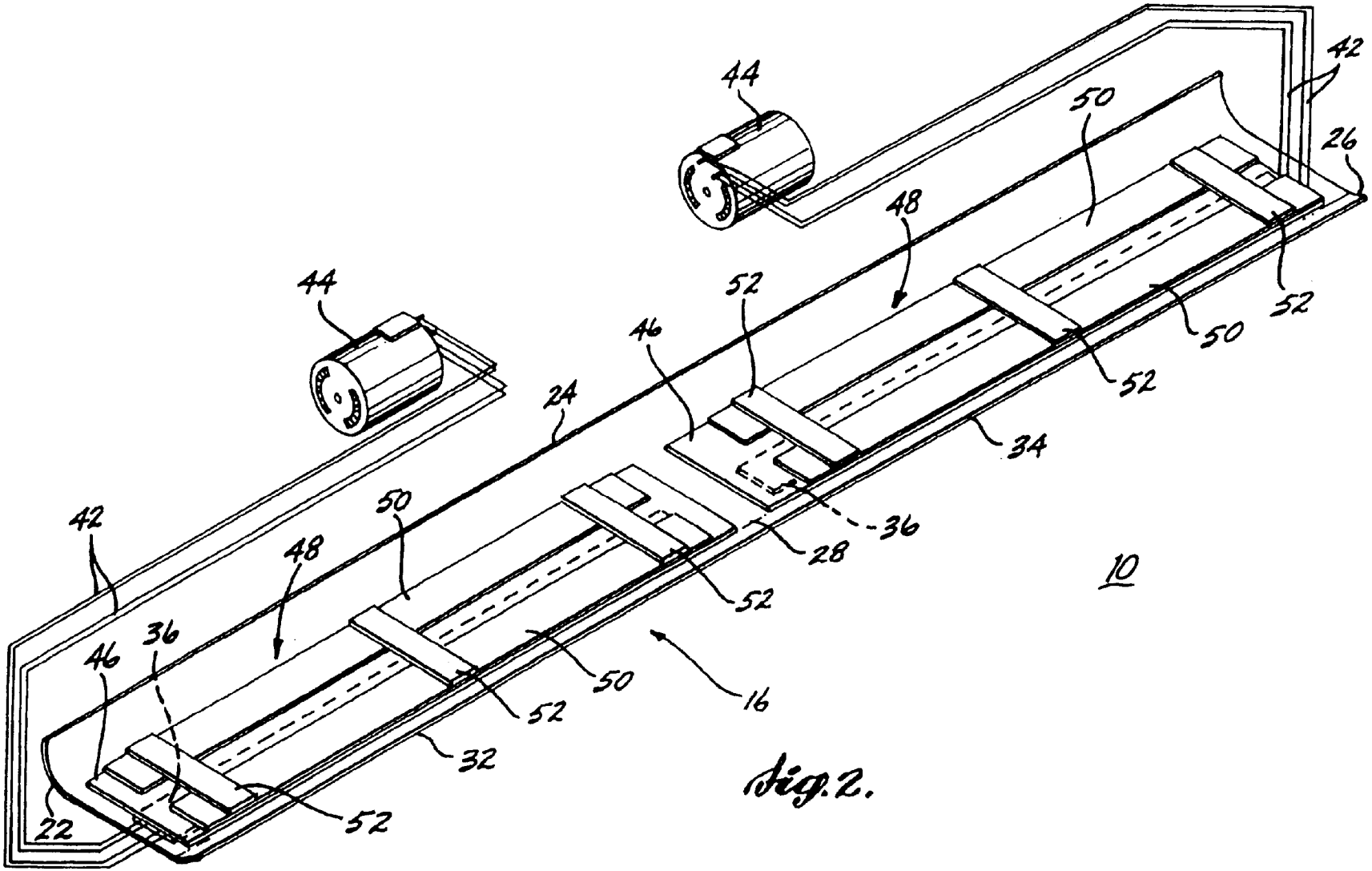
FIG. 2 presents an isometric view of a heated screed assembly constructed in accordance with the present invention.
Figure 3:
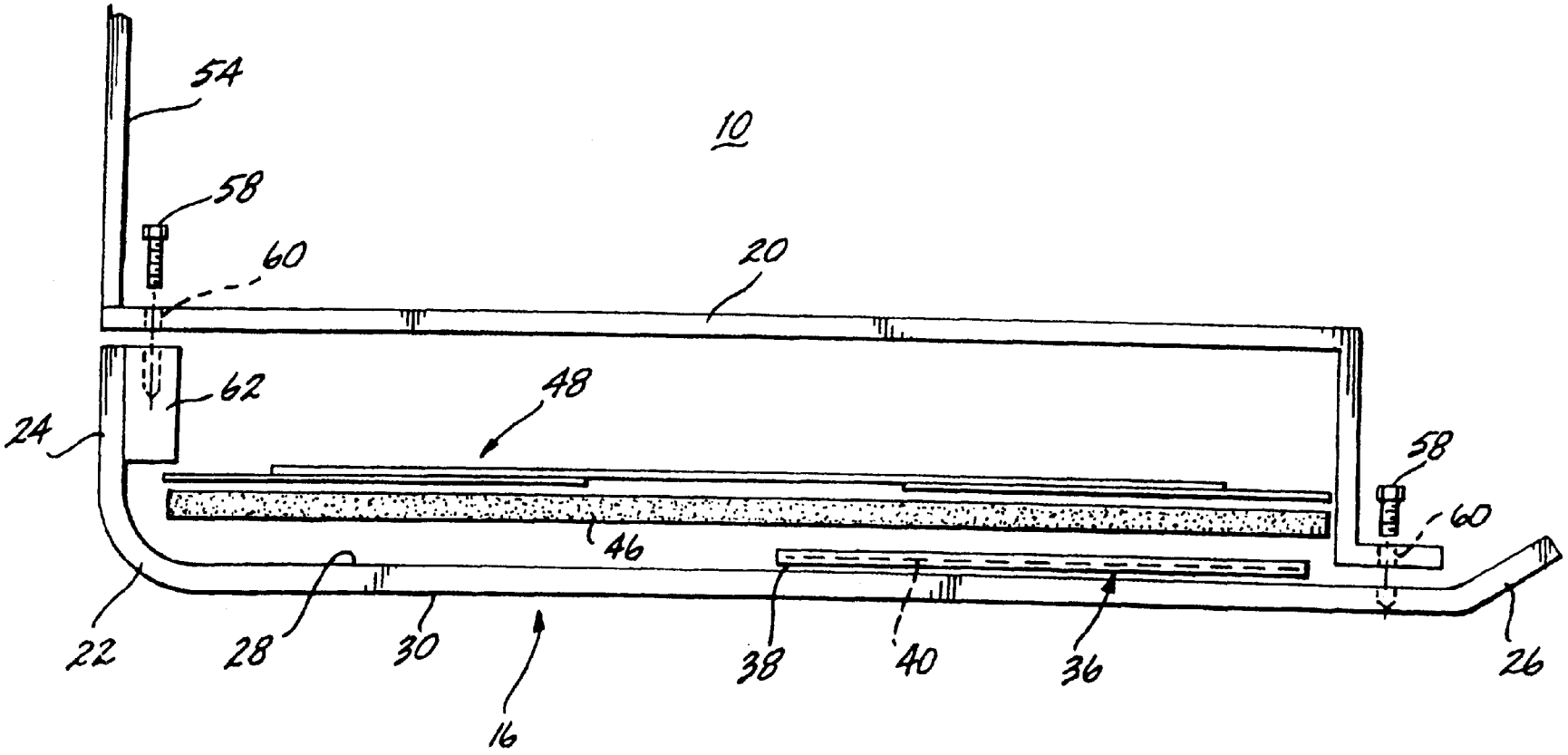
FIG. 3 provides an exploded, end view of the screed assembly of FIG. 2.

Referring to FIGS. 2 and 3, the screed assembly 10 includes a screed 16 that consists of an elongate flat metal plate. The forward long edge of the screed 16 is bent upwardly to define a radiused corner edge 22 and an upwardly extending forward face portion 24. As used herein throughout, forward refers to the long side of the screed 16 that is closest in proximity to the paving machine 12, while "rearward" refers to the opposite direction. In use, the screed 16 is pulled in the forward direction, so that the paving material is fed under the radiused corner edge 22. The rearward long edge of the screed 16 is bent at an approximately 40° angle to define an upwardly inclined, rearward tail portion 26. In between the forward face portion 24 and the rearward tail portion 26, the screed 16 defines a flat upper surface 28 and a bottom surface 30. Referring to FIG. 2, the screed 16 has a left side portion 32 and a right side portion 34.

The screed 16 is heated by two elastomeric heating elements 36. Each elastomeric heating element 36 is formed from an elastomeric body 38 in which is embedded a resistive conductor 40, e.g., a thin conductive wire or ribbon. Each resistive heating element 36 is configured as a thin, elongate sheet. The length of each resistive heating element 36 is slightly less than one-half of the length of screed 16. The width of each elastomeric heating element 36 is slightly less than one-half the width (i.e., the forward to rearward dimension) of the upper surface 28 of the screed 16.

As shown in FIG. 2, the elastomeric heating elements 36 are positioned on top of the upper surface 28 of the screed 16, in end-to-end, spaced relationship. Thus a first heating element 36 overlies the left portion 32 of the screed 16 and the second heating element 36 overlies the right portion 34 of the screed 16. Each heating element 36 is preferably positioned adjacent the rearward tail portion 26 of the screed 16. The resistive conductor 40 within each heating element 36 terminates in leads 42 that protrude from one end of the heating element 36. The heating elements 36 are positioned on the screed 16 such that the conductor leads 42 of each heating element 36 are disposed adjacent the corresponding end of the screed 16.

The elastomeric body 38 of each heating element 36 has several purposes. The elastomeric body 38 serves to cushion and protect the resistive conductor 40, absorbing shock and vibration that is transferred to the heating element 36 from the screed 16, to prevent breakage of the resistive conductor 40. The elastomeric body 38 must also be able to conduct heat to the screed 16, must withstand the operating temperatures of the screed, and preferably is also resistant to hydraulic oil, tar and other industrial fluids. One suitable elastomeric material is high temperature silicone rubber. Such silicone rubber heating pads are commercially available. One suitable type of heating pad is a silicone rubber heating pad that supplies five watts of heat per square inch, which is available from Watlow Electric Company, St. Louis, Mo. This particular heating pad has approximately a ⅛th inch thickness.

The arrangement of the heating pad in two different sections facilitates flexing of the screed 16 during use. Each heating pad 36 is connected to an electric power supply. One suitable electric power supply for the practice of the present invention is an electric generator 44, with the poles of each generator 44 being connected to the leads 42 of a corresponding heating element 36. Each generator 44 can be mounted on the screed assembly or the paving machine, and may be powered by connecting the existing oil supply from the paver to a hydraulic motor, which then turns the generator. The generator 44 may be either a direct current or alternating current generator. For example, either a 12 or 24 volt DC or 110 or 240 AC generator may be utilized. One suitable sized generator has been found to be a 7000 watt, 110 volt AC generator.

The bottom surface of each heating element 36 is in direct contact with the upper surface 28 of the screed 16. Heat thus conducts from the heating element 36 to the screed 16. Because the two heating elements 36 cover[s] essentially the entire end-to-end length of the screed 16, except for a small space between the heating elements and on either end of the heating element, the screed 16 is heated substantially uniformly and evenly across its entire length. Heat from the heating elements 36 also conducts along the width of the screed 16, which is only a relatively short distance, such that substantially the entire bottom surface 30 of the screed 16 is heated to a uniform temperature.

To reduce loss of heat from the beating elements 36, a layer of insulation material 46 is positioned to overly each heating element 36. Two sheets of insulation material 46 are employed, with each sheet covering either the left portion 32 or right portion 34 of the screed. One suitable type of insulation has been found to be R-9 fiberglass insulation, ½ thick, including a foil layer that is adhered to the upper surface of the insulation.

The heating elements 36 and insulation 46 are loosely positioned on top of the upper surface 28 of the screed 16. They are not mechanically constrained in their installed positions, except for by the forward face plate portion 24 and tail portion 26 of the screed 16 and the side plates 18. Thus the heating elements 36 are substantially free to move in all directions along the plane defined by the upper surface 28 of the screed 16, with the limits of this movement being defined by the upper face plate portion 24, tail portion 26 and side plates 18.

However, in order to ensure that movement of the heating elements 36 along the plane of the upper surface 28 is substantially prevented during operation of the screed assembly 10, and to also ensure that the heating elements 36 stay in intimate contact with the screed 16 while being vibrated during operation, retaining plate assemblies 48 are positioned atop each sheet of insulation material 46. Each retainer plate assembly 48 thus overlies both a sheet of insulation material 46 and a heating element 36. Each retainer plate assembly 48 is formed from two parallel, spaced elongate plates 50. The distance between, and parallel orientation of, the plates 50 is maintained by a plurality of cross plate members 52 that are welded across the tops of the plates 50.

The length and width of the retainer plate assemblies 48 is nearly the length and the width of the sheets of insulation material 46. Preferably, the retainer plate assemblies 48 are constructed from steel. The weight of the retainer plate assemblies 48 is sufficient to slightly compress the insulation material 46 and heating elements 36. The elastomeric material employed to form the heating elements 36 has a relatively high frictional coefficient, such that heating element 36 does not move substantially during operation in the plane of the screen. The weight of the retaining plate assembly 48 also prevents vertical separation of the heating element 36 from the screen 16.

Because of the shock absorbence provided by the elastomeric body 38 surrounding the resistive conductor 40, and the secure positioning provided by the retaining plate 48, breakage and failure of the resistive conductor 40 is avoided. It should be apparent to those of ordinary skill in the art that other electric heating elements could be used in place of the elastomeric heating element 36, in accordance with the present invention. For example, cal-rods or other electric heating elements could be welded to the upper surface of the screed 16. However, such rigid heating elements are not preferred because of their potential for breakage, and because of the stresses that could be induced by welding or other form of fixed securement to the screed 16. Because the elastomeric heating elements 36 are not fixedly secured, no additional stresses are introduced to the screed 16.

Referring to FIG. 3, the screed 16 is mounted to a mold board 54 and the deck plate 20 in a conventional manner. One such suitable mounting is the use of bolts 58 that pass through apertures 60 and are received within internally threaded apertures, formed along the rearward edge of the screed 16 and within mounting blocks 62 attached to the inside of the forward face plate portion 24 of the screed 16.

The configuration of the heated screed 10 of the present invention allows for rapid heating of the screed 16 to operation temperature. Screeds are conventionally operated at temperatures ranging from 180° to 300° F. A large screed (i.e., extending the full width of a conventional paving machine) can be brought up to an operation temperature of 190° in a time period of 12 minutes by using the heating system of the present invention. This is compared to 40 minutes typically required to bring a screed of the same size to operation temperature when heated with fossil fuels. When a conventional liquid circuit heating system is utilized, a large screed of this size may require in excess of 40 minutes to bring the screed up to operation temperature.

During operation, heat may be applied to the screed 16 either continuously or intermittently, depending on ambient temperatures and operation speeds. For intermittent operation, the supply of power to the heating elements 36 can be either manually controlled through the provision of a switch (not shown), or automatically through the provision of a thermostat (not shown).

While the foregoing heated screed 10 has been described for use with a main screed that extends the entire width of a paving machine, it should be apparent to one of ordinary skills in the art that the present invention can be readily adapted for heating of smaller side-extension screeds, which are used to extend the paving width afforded by a paving machine. This adaptation merely requires scaling down the size of the system components.

While the preferred embodiment of the present invention has been illustrated and described, various modifications, alterations and substitutions can be made by one of ordinary skill in the art, based on the disclosure contained herein, without departing from the spirit and scope of the invention. It is therefore intended that the scope of letters patent granted hereon be limited only by the definitions contained in the appended claims.

The embodiments of the invention in which an exclusive property or privilege is claimed are defined as follows:

1. A heated screed assembly for use with a paving machine, comprising:

a screed;

an elastomeric, electrically powered heating element *assembly* disposed in contact with the screed, wherein the heating element *assembly* overlies and evenly heats a majority of the operative area of the screed; and an electric power supply.

2. The heated screed of claim 1, wherein the heating element *assembly* comprises an elastomeric pad in which is embedded a resistive conductor.

3. The heated screed of claim 2, wherein the elastomeric pad is disposed to cover a portion of an upper surface defined by the screed.

4. The heated screed of claim 3, wherein the elastomeric pad is retained in position by the weight of a retainer plate disposed to overlie the pad.

5. The heated screed of claim 4, further comprising a layer of insulation disposed between the elastomeric pad and the retainer plate.

6. The heated screed of claim 1, wherein the electric power supply comprises an electric generator.

7. The heated screed of claim 6, wherein the electric generator is powered by the paving machine.

8. A heated screed assembly for use with a paving machine, comprising:

a screed having a length and a width defining an upper surface;

an electrically powered resistive heating element including means for cushioning the heating element, carried on the upper surface of the screed, wherein the heating element is configured as a flat sheet that evenly heats the screed along the length of the screed; and a retaining member disposed to overlie the heating element, whereby the heating element is retained in contact with the upper surface of the screed during operation of the paving machine.

9. The heated screed of claim 8, wherein the resistive heating element includes an embedded resistive conductor.

10. The heated screed of claim 9, wherein the [body] *cushioning means* comprises an elastomeric sheet.

11. The heated screed of claim 8, wherein movement of the resistive heating element along the upper surface of the screed is substantially prevented by friction between the resistive heating element and the upper surface of the screed induced by the weight of the retaining member.

12. The heated screed of claim 11, wherein the resistive heating element comprises a sheet and the retaining member comprises a retaining plate.

13. The heated screed of claim 12, wherein the retaining plate comprises a grid of plate submembers.

14. The heated screed of claim 8, further comprising a layer of insulation disposed to insulate a first side of the resistive heating element that is opposite of a second side of the resistive heating element that is in contact with the screed.

15. The heated screed of claim 14, wherein the layer of insulation is disposed between the resistive heating element and the retaining member.

16. The heated screed of claim 8, further comprising an electric power supply.

* * * * *